Jan. 30, 1962 R. H. VARIAN 3,019,383
GROUND LIQUID PROSPECTING METHOD AND APPARATUS
Filed Feb. 2, 1956
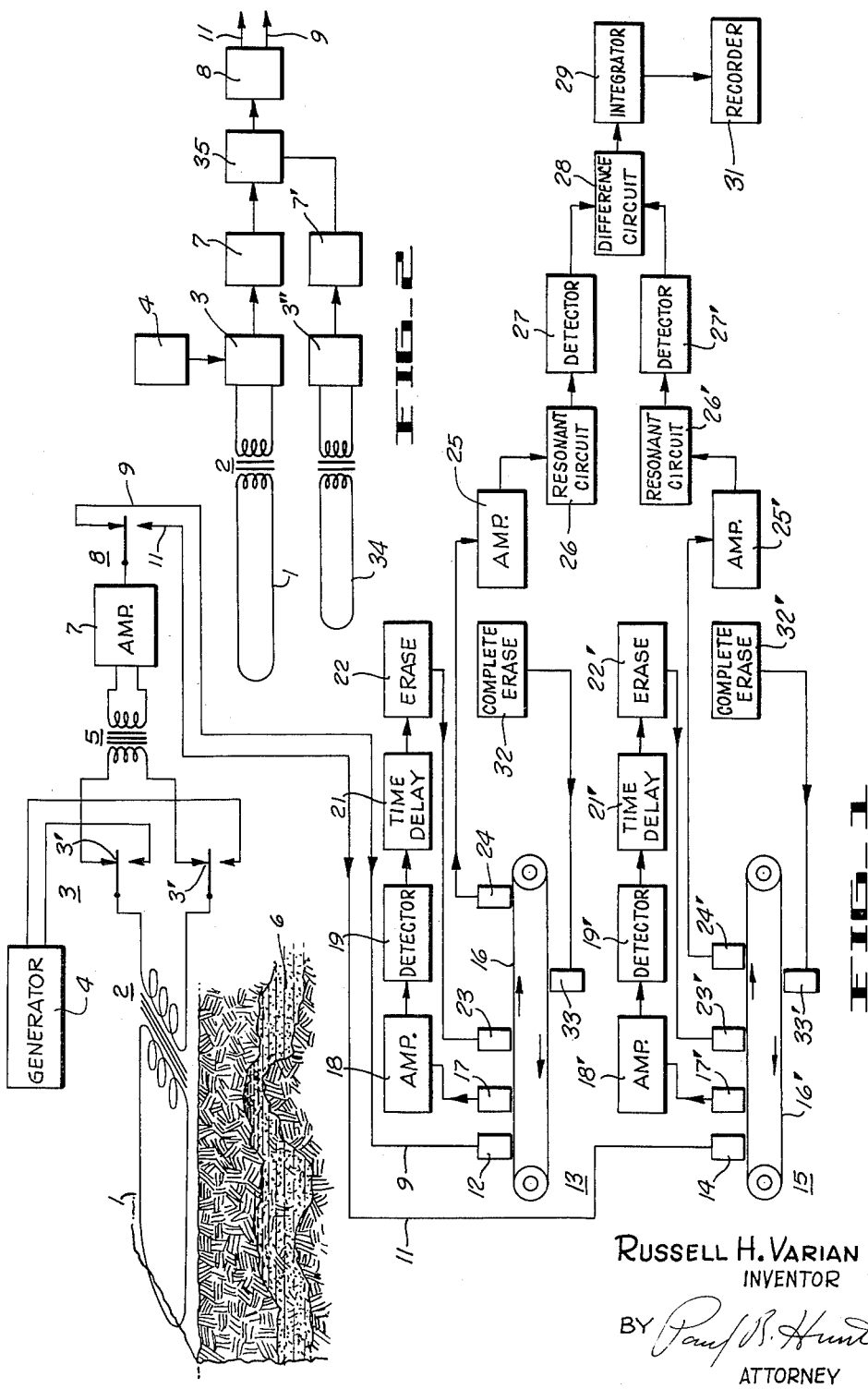
RUSSELL H. VARIAN
INVENTOR
BY
ATTORNEY United States Patent Office 3,019,383
Patented Jan. 30, 1962

3,019,383
GROUND LIQUID PROSPECTING METHOD
AND APPARATUS
Russell Harrison Varian, Cupertino, Calif., assignor to
Varian Associates, San Carlos, Calif., a corporation of
California
Filed Feb. 2, 1956, Ser. No. 563,116
13 Claims. (Cl. 324—.5)

This invention relates in general to subsurface prospecting and more particularly to a novel method and apparatus for locating subsurface liquids such as water by utilizing certain gyromagnetic properties of the nuclei in the liquids such as the protons in subsurface water.

In geophysical methods for locating subsurface or ground liquids such as water, the major emphasis in the past has been placed upon indirect methods, that is, by locating surface or subsurface geological structures which would indicate the probable presence of subsurface oil or water or the like. Along with surface geological observation, electrical, magnetic, and seismic methods have been utilized to secure subsurface structural information which serves to indicate the presence of subsurface basins, faults, liquid-containing channels, subsurface structural barriers such as igneous dykes, and other liquid-bearing strata. The results of these observations and measurements were employed to determine the extent, thickness, depth, composition, etc., of the liquid-bearing strata. This concentration on the indirect type of investigation has resulted from the fact that no effective method or apparatus has heretofore been discovered for locating the underground liquids by directly measuring the characteristics of the liquids.

It is, therefore, the principal object of the present invention to proivde a novel method and apparatus for detecting subsurface liquids by measuring certain gyromagnetic characteristics of the nuclei in the underground liquids and to also provide a novel method and apparatus for recording and editing the signals obtained from nuclear gyromagnetic free precession apparatus.

One feature of the present invention is the provision of a novel method and apparatus for producing free precession, in the earth's magnetic field, of the nuclei in the ground liquids such as protons in water and for detecting the signal produced by the precessing nuclei.

Another feature of the present invention is to provide a novel method and apparatus for applying a strong A.C. magnetic field, at the earth's surface, which is at an angle to the earth's magnetic field, this A.C. magnetic field driving the nuclei in the underground liquid in a precessional manner at their Larmor frequency in the earth's magnetic field, turning the A.C. magnetic field off rapidly so as to enable the nuclei to freely precess in the earth's magnetic field, and detecting the magnetic signal produced by the magnetic moments of the precessing nuclei, the signal serving to indicate the presence of ground liquid and its characteristics such as amount, depth, etc.

Another feature of the present invention is the provision, in association with the immediately preceding feature, of a single, coil of wire adapted to be positioned on the surface of the ground for serving as the circuit means for applying the A.C. magnetic field to the earth's subsurface and for also detecting the magnetic signal produced by the nuclei precessing in the earth's magnetic field.

Still another feature of the present invention is the provision, in association with the foregoing features, of a recording system in which the signal from the surface coil of wire is transmitted to one recorder apparatus during that period of time in which the nuclei are freely precessing in the earth's magnetic field and in which the signal from the surface or pickup coil is transmitted to another recorder during a period of time in which the nuclei are not precessing and comparing the two recorded signals so that one may detect the difference between the signals and may separate the characteristics of the pickup signal due to the precessing nuclei from extraneous signals and interferences produced in the pickup coil.

Still another feature of the present invention is the provision of a novel gyromagnetic resonance system in which the free precession signals obtained from a free precession gyromagnetic resonance apparatus are recorded on a magnetic tape or the like which may then be edited to eliminate spurious interference signals, which are, in the main part, short, strong pulses, from the recording tape before the signal is finally recorded on a visual recording chart or the like.

These and other features and advantages of the present invention will become apparatus upon a perusal of the following specification taken in connection with the drawings wherein, FIG. 1 is a schematic block diagram of one embodiment of the present invention shown in use in detecting underground water, and FIG. 2 is a schematic block diagram of a portion of another embodiment of the invention showing novel apparatus for eliminating spurious signals.

This present invention utilizes the principle of free precession gyromagnetic resonance, that is, the precession of atom portions such as hydrogen nuclei possessing the properties of gyroscopic moment and magnetic moment in a unidirectional magnetic field after the nuclei have been first polarized or otherwise oriented at an angle with respect to said magnetic field and then released from said orientation to permit the free precession. In a free precession magnetometer in present use, the hydrogen nuclei contained in about a quart of water are polarized by a D.C. magnetic field produced by a coil surrounding the plastic water container, the polarizing field being directed at an angle, say 90°, with respect to the magnetic field to be measured, for example, the earth's magnetic field. The polarizing magnetic field is quickly turned off thus permitting the nuclei to freely precess in phase with one another at their Larmor frequency in the earth's magnetic field. The alternating magnetic field produced by the precessing nuclei is detected by the coil. The frequency at which the nuclei are precessing is measured and, by utilizing this frequency value, the strength of the earth's magnetic field may be accurately determined, since the earth's magnetic field is directly proportional to the Larmor frequency of the hydrogen nuclei therein, the Larmor frequency increasing as the magnetic field strength increases The gyromagnetic free precession principle is used in this present liquid prospecting invention and, although this invention is applicable to different types of subsurface liquids, the following description will be directed to ground water detection. A large coil of wire is stretched out over the surface of the earth where one desires to make a ground water sounding or measurement. The coil is so arranged that the magnetic field produced by it will be at an angle, preferably but not necessarily 90°, to the earth's magnetic field at that location. If the coil lies flat on the ground its axis will always make an angle with respect to the earth's magnetic field except at the magnetic poles. The size of the coil necessary for this purpose will bear a rough relationship to the depth one wishes the sounding to reach. For example, if the depth desired is about 500 feet, it is desirable, for optimum results, to use a coil with a diameter of about 500 feet.

An alternating current of the Larmor frequency for hydrogen nuclei in the earth's field (about 2,000 c.p.s.) is supplied to the coil to produce the magnetic field needed to cause a preponderance of the hydrogen nuclei in the water to precess about the axis of the earth's field. An A.C. driving field is utilized to orient the nuclei relative to the earth's magnetic field rather than a D.C. field, as in the case of free precession magnetometers, since the power needed to produce the orientation, about 10 kw., is so much less than if one were to attempt to use a D.C. field for ground water polarization. The sensitivity of the method employing the A.C. driving field is computed to be about $200\pi$ times that obtainable by using a D.C. magnetic field for polarizing for a given input power.

This A.C. magnetic field penetrates into the earth and produces forced precession, in the earth's field, of the hydrogen nuclei in the ground water, if any. The A.C. field is then quickly terminated, leaving the nuclei to freely precess in a coherent manner or, in other words, in phase with each other in the earth's magnetic field. If there exists ground water in sufficient quantity for practical removal by a well bore or the like, such as a water-laden coarse sediment strata, a sufficient abundance of hydrogen nuclei will be present to produce a detectable alternating magnetic field due to their coherent free precessions. This produced magnetic field will be detected by the surface coil as an A.C. current of the Larmor frequency and transmitted through an amplifier to a suitable recording apparatus. The characteristics of this detected signal, which may last for about $\frac{1}{10}$ second in rather typical formations before completely fading out, particularly the amplitude of the signal, will be an indication of the amount of ground water present.

To distinguish the nuclear free precession signals from random, spurious signals induced in the surface coil due to stray fields and the like, it is advantageous to record the signals from the coil both during nuclear free precession periods and during periods of no precessions so that the two sets of recorded signals may be compared and the difference between the two noted. This difference will be a measure of the induced nuclear free precession signal and thus an indication of the ground water present.

Referring to FIG. 1 there is depicted one preferred embodiment of the present invention. A large wire loop or coil 1 adapted to be stretched out over the earth's surface is coupled through a transformer 2 to a programing switch 3, shown as break-make contacts. The coil 1 is preferably formed of a litz conductor to reduce the resistance due to the skin effect of the cable. The programing switch 3 is operated so as to alternately connect the primary winding of transformer 2 to a signal generator 4 and a second transformer 5. The signal generator delivers an alternating current of about 2000 cycles/sec. and 10 kw. power to the coil 1 to thereby produce a forced precession of the hydrogen nuclei in the ground water-bearing coarse sediment strata 6, if any. The transformer 2 is a voltage step-down type so constructed as to produce as high a current flow in coil 1 as possible, for example, of the order of hundreds of amperes. The programing switch 3 then operates to transfer the coil 1 from the generator 4 to a voltage step-up transformer 5, the secondary winding of which is connected to an amplifier circuit 7. On removal of the 2000 cycle/sec. A.C. field, the hydrogen nuclei freely precess in the earth's magnetic field and induce a short signal in the coil 1, this signal being transmitted to the amplifier section 7 for amplification. The input signal to the amplifier 7 may be of the order of 1 millivolt. This cycle of generating an A.C. signal in the coil 1 and then switching the coil 1 from the generator 4 to the amplifier 7 is repeated periodically, for example, two or three times per second.

The output of amplifier 7 is coupled to another programing circuit 8, shown as a break-make contact switch. Switch 8 is synchronized with switch 3 so that when contacts 3' close to couple the coil 1 to the amplifier 7, the break contacts of switch 8 are closed and couple the output of amplifier 7 through line 9 to the recording head 12 of a first magnetic recorder mechanism 13. The switch 8 is also arranged to switch the amplifier output circuit from line 9 to line 11 after the normal "ringing" or free precession period, about $\frac{1}{10}$ of a second after contacts 3' are first closed in certain typical applications, so that the coil 1 will be coupled to the recording head 14 of a second recorder mechanism 15. Thus the signals induced in the coil 1 during that period of time when a free precession signal would normally be present is recorded on the magnetic tape 16 of recorder 13 while the signals induced in the coil 1 during a period after the free precession signal has decayed is recorded on the magnetic tape 16' of recorder 15. Both recordings can obviously be made on the same tape.

It has been found from previous nuclear free precession work in the earth's field that the main type of noise which tends to mask the detected free precession signals is a random series of short bursts of noise of appreciable amplitude. These bursts of noise, in addition to masking free precession signals, also tend to set up bursts of resonance of appreciable length in the electronic resonator circuits of the system which in turn tends to destroy free precession signals. For this reason a novel system is utilized to edit each of the magnetic tapes 16 and 16' to remove all of these short bursts before further analysis of the tapes is undertaken to determine the characteristics of the free precession signal. To accomplish this, editing systems are provided associated with each recorder 13, 15. The two editing systems are similar and the system associated with recorder 13 will be described, the other system bearing the same reference numerals primed on similar elements. The editing system comprises a pickup head 17, amplifier 18, detector 19, a time delay circuit 21, erase circuit 22 and associated erase head 23. The time delay circuit 21 may comprise a "one-shot" multivibrator, for example. The recorded signals on tape 16 are picked up by head 17 and amplified in amplifier 18. The A.C. signal output from amplifier 18 is transmitted to the detector 19 where the amplitudes of the A.C. signals are converted to D.C. signal voltages. When the D.C. signal voltages are greater than a predetermined maximum allowable amplitude, which occurs during the before-mentioned strong pulses, these short D.C. voltage pulses serve to trigger the one-shot multivibrator circuit 21 which delivers a pulse, delayed in time, to the erase circuit 22 which then operates to transmit a pulse of erase current to the erase head 23. The erase pulse produced is about a few milliseconds duration to insure adequate elimination of the undesired strong noise pulse. The time delay is sufficient to allow the noise signal on the tape which instigated the erasing voltage to pass from under the pickup head 17 to under the erase head 23. As stated above, the editing system associated with recorder 15 operates in a similar manner to eliminate undesired bursts of noise from tape 16'.

The next step is to compare the signals recorded on tape 16 with those recorded on tape 16' and, since the signals on the two tapes are displaced in time, the two pickup heads 24 and 24' are relatively displaced so that the signal pulses recorded on tapes 16 and 16' will be reproduced simultaneously. These signals are picked up by heads 24 and 24', amplified in amplifiers 25 and 25' and filtered in resonant circuits 26 and 26' which are tuned to the Larmor free precession frequency of the protons in the underground water. The outputs of the resonant circuits are coupled to detector circuits 27 and 27', respectively, where the A.C. amplitude variations are converted to proportional D.C. amplitude variations, the resultant output being the envelope of precession signal. The D.C. output signals are then transmitted to a suitable computer circuit 28 in which the D.C. signal from the lower recorder apparatus is subtracted from the D.C. signal from the upper recorder to thereby balance out that portion of the signal on tape 16 caused by noise. The difference voltage is therefore a measure of the signal due to the free precession signals. This difference signal is then transmitted to an integrating network 29 where the total E.M.F. of the signal is determined. The resultant signal may then be recorded on recorder apparatus 31 and subsequently analyzed to render its information relative to the ground water. The signals may be integrated over a relatively long period, say ten minutes, covering a large number of separate soundings, the output of the integrator being the sum total E.M.F. of the plurality of free precession signals.

Erase circuits 32 and 32' and associated erasing heads 33 and 33' are provided for completely erasing the two tapes 16 and 16' so that the tapes may be recycled for subsequent recording.

Inaccessible water in water-clay mixtures will not give a free precession signal since the relaxation time, that is the time it takes for the nuclear free precession signal to decay, is very short in water-clay mixtures, even when a relatively large amount of the water-clay mixture is water. Therefore, no noticeable free precession signal will be obtained from such earth formations and the occurance of a detectable signal will indicate that the water located is in a more readily available environment.

Referring to FIG. 2 there is shown apparatus which may be utilized in addition to that shown in FIG. 1 for eliminating a portion of the noise from the system prior to recording the induced signals. For this purpose, a second, smaller coil 34 is provided and is spread out over the earth's surface near the first coil 1 but outside the range of influence of fields induced by the currents in coil 1 and outside the influence of the freely precessing protons in the ground water. The coil 34 has induced therein voltages due to the stray fields which also induced noise into the system of coil 1. As above stated, these noise signals are usually in random bursts, which, for example, may be caused by distant lightning storms. These large noise signals induced in coils 1 and 34 have a phase and amplitude coherence since they are produced by the same random noise source.

A switching circuit 3" is provided for coupling the coil 34 through to an amplifier 7' during the same period of time coil 1 is coupled to amplifier 7. The amplifier 7' is arranged so that the amplitude of the noise signals from coil 34 will be amplified so that they are substantially equal in magnitude to the noise signals from coil 1. The outputs from amplifiers 7 and 7' are transmitted to a suitable difference-determining circuit 35, such as a balanced bridge, where the signals from amplifier 7' are subtracted from the signals coming from amplifier 7. In this manner, the major bursts of noise may be eliminated from the system before the output from the computer 35 is transmitted to switch 8 for coupling to the recorders 13 and 15 where additional noise editing may be produced as explained for FIG. 1.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for use in detecting an underground liquid having nuclei possessing the properties of magnetic moment and gyroscopic moment which comprises means for first applying an alternating magnetic field at the Larmor frequency of the nuclei in the earth's magnetic field to the earth at the earth's upper surface and at an angle to the earth's magnetic field to thereby reorient a preponderance of the nuclei in the liquid which may be under the upper surface from alignment with the earth's magnetic field and for then removing the applied alternating magnetic field to thereby permit the nuclei to precess freely at their Larmor frequency in the earth's magnetic field, said first means applying said alternating magnetic field to the earth in a rapid succession of pulses, said magnetic field produced by the precessing nuclei being detected in a rapid succession of pulses between said applied magnetic field pulses, means at the upper surface for detecting the magnetic field produced by the precessing nuclei, the characteristics of said detected signal serving to indicate the existence of the underground liquid, and integrator means coupled to said detecting means for integrating the detected nuclear resonance signals over a long period of time.

2. Apparatus as claimed in claim 1 wherein said first means includes a generator for providing electrical energy at the Larmor frequency of the nuclei in the earth's magnetic field and a coil coupled to the generator adapted to be stretched out over the earth to thereby induce said first magnetic field therein.

3. Apparatus as claimed in claim 2 wherein said coil is a litz conductor.

4. Apparatus as claimed in claim 2 wherein said liquid is ground water, the generator producing electrical energy at the Larmor frequency of the hydrogen nuclei in the ground water.

5. Apparatus for use in detecting an underground liquid having nuclei possessing the properties of magnetic moment and gyroscopic moment which comprises a coil of wire adapted to be stretched out over the earth's surface, a source of alternating energy, the frequency of which is substantially equal to the Larmor precession frequency of said nuclei in the earth's magnetic field, means for coupling said alternating energy source to said coil to thereby induce an alternating magnetic field in the earth to produce a precession of the nuclei in said liquid which may be present under the earth's surface, recorder means, and means for transferring the coil from the alternating energy source to said recorder means whereby the free precession of the nuclei in said matter, if any, will induce a voltage in the coil which will be transmitted to the recorder means for recording thereon.

6. Apparatus as claimed in claim 5 including a second coil of wire adapted to be stretched out over the earth's surface a distance from said first coil so as not to be inductively coupled to the precessing atom portions under the earth's surface and means for subtracting random noise signals induced in said second coil from the random noise signals induced in said first coil.

7. Apparatus for use in detecting an underground liquid having nuclei possessing the properties of magnetic moment and gyroscopic moment which comprises a coil of wire adapted to be stretched out over the earth's surface, a source of alternating energy, the frequency of which is substantially equal to the Larmor precession frequency of said nuclei in the earth's magnetic field, an amplifier, switching means for alternately switching said coil between said source of alternating energy and said amplifier so that, during the period said alternating energy source is coupled to said coil, an alternating magnetic field is induced in the earth to produce a precession of the nuclei in said liquid which may be present under the earth's surface and, when said alternating energy source is decoupled from said coil and said coil is coupled to said amplifier, the nuclei in said matter are free to precess at their Larmor frequencies in the earth's magnetic field and induce an alternating current in said coil which is transmitted to said amplifier, recorder means coupled to the output of said amplifier during the period said nuclei are freely precessing in the earth's magnetic field and during the period after said free precession signal has decayed, means associated with said recorder means for editing the recordings thereon so that all signals with amplitude over a predetermined value will be automatically erased from said recorder means, said recorder means including a first reproducing means for reproducing, after said editing, the signals recorded during said free precession period and a second reproducing means for reproducing, after said editing, the signals recorded during the period after said free precession signals have decayed, filter circuits tuned to the Larmor precession frequency of said nuclei coupled to the output of said reproducing means, detector circuits coupled to the output of each of said filter circuits for transforming the A.C. signal outputs of said filter circuits to D.C. signal voltages,, circuit means coupled to the output of said detector for subtracting the D.C. signal output of said second reproducing means from the D.C. signal output of said first reproducing means, the difference signals being a measure of the signal recorded on said recording means due solely to the signal induced in said coil due to the free precessing nuclei, and means for recording the output of said last circuit means.

8. Apparatus for use in detecting an underground liquid having nuclei possessing the properties of magnetic moment and gyroscopic moment which comprises a coil of wire adapted to be stretched out over the earth's surface, a source of alternating energy, the frequency of which is substantially equal to the Larmor precession frequency of said nuclei in the earth's magnetic field, a radio frequency amplifier, switching means for alternately switching said coil between said source of alternating energy and said amplifier so that, during the period said alternating energy source is coupled to said coil, an alternating magnetic field is induced in the earth to produce a precession of the nuclei in said liquid which may be present under the earth's surface and, when said alternating energy source is decoupled from said coil and said coil is coupled to said amplifier, the nuclei in said matter are free to precess at their Larmor frequencies in the earth's magnetic field and induce an alternating current in said coil which is transmitted to said amplifier, a pair of magnetic recorders each having an associated recording head, a second switching means for coupling the output of said amplifier from one of said recording heads to the other, the first of said recording heads being coupled to said amplifier during the periods said nuclei are freely precessing in the earth's magnetic field and said second recorder head being coupled to the output of said amplifier during the period after said free precession signal has decayed, means associated with each of said recorders for editing the magnetic recordings thereon so that all signal amplitudes over a predetermined value will be automatically erased from said recorders, means including pickup heads associated with each of said recorders for picking up the signals recorded thereon after said editing, amplifiers coupled to each of said pickup heads, resonant circuits coupled to each of said amplifiers, said resonance circuits being tuned to the Larmor precession frequency of said nuclei, detector circuits coupled to the output of each of said resonance circuits for transforming the A.C. signal outputs of said resonance circuits to D.C. signal voltages, circuit means coupled to the output of said detectors for subtracting the D.C. signal output of said second recorder from the D.C. signal output of said first recorder, the difference signal being a measure of the signal recorded on said first recorder due solely to the signal induced in said coil due to the free precessing nuclei, and means for recording the output of said last circuit means.

9. Apparatus for improving the free precession signals obtained from a continuously operating nuclear free precession system delivering periodic free precession signals which comprises tape recorder means for recording the periodic nuclear resonance free precession signals continuously, means for reproducing these recorded signals including means for measuring the amplitude of the recorded signals, means coupled to said measuring means for producing an erasing signal when the signals recorded on the tape exceed a predetermined maximum amplitude, and means responsive to said erasing signal for erasing the recorded signals which produced said erasing signal.

10. Apparatus as claimed in claim 9 wherein said recorder means comprises a recorder head for recording said free precession signals on a recording medium, said reproducing means and said erasing means comprising a pickup head associated with said recording medium for detecting the recorded signals, an amplifier coupled to said pickup head, an erasing head associated with said recording medium and means coupling said amplifier and said erasing head for producing and transmitting an erasing signal voltage to said erasing head when the signals picked up by said pickup head exceed said predetermined maximum amplitude.

11. Apparatus as claimed in claim 10 wherein said last means comprises a detector circuit coupled to said amplifier for converting the A.C. voltage output of said amplifier to a D.C. voltage, and a time delay circuit coupled to the output of said detector for delaying said erasing voltage until such time as the undesired maximum signal passes under said erasing head.

12. Apparatus for obtaining improved gyromagnetic signals from atom portions having the properties of magnetic moment and gyroscopic moment precessing in a magnetic field which comprises means for polarizing the atom portions at an angle with respect to said magnetic field and for then terminating the action of said polarization means so that said atom portions may be freed to precess in said first magnetic field, means for detecting said free precessions, a first and second recorder means, means for alternately switching said detector means between said first and second recorder means, the signals from said detector means being recorded on said first recorder means during the period said nuclei are freely precessing coherently in the earth's magnetic field and the signals from said detector means being recorded on said second recorder after the decay of said coherent precessions, and means for computing the difference between the signals recorded on the two recording means.

13. Apparatus as claimed in claim 12 wherein said last means comprises pickup heads associated with each recorder means for detecting the signals recorded thereon, amplifier circuits coupled to the output of each of said pickup heads, tuned filter circuits coupled to the output of each of said amplifiers, said filter circuits being tuned to the Larmor precession frequency of the free precessing nuclei, detector circuits coupled to the output of said filter circuits for transforming the A.C. output of said filter circuits to a D.C. output voltage, circuit means coupled to the output of said detector circuits whereby the D.C. output voltages from each of said detector circuits may be subtracted one from the other to produce said difference voltage signal, an integrator circuit coupled to the output of said circuit means for integrating the output difference signal over a predetermined period of time, and a recording means coupled to the output of said integrator for permanently recording the integrated signal obtained.

References Cited in the file of this patent

UNITED STATES PATENTS

| | | |
|---|---|---|
| Re. 23,769 | Varian | Jan. 12, 1954 |
| 1,855,184 | Fisher | Apr. 26, 1932 |
| 2,705,790 | Hahn | Apr. 5, 1955 |
| 2,779,428 | Silverman | Jan. 29, 1957 |
| 2,927,656 | Feagin et al. | Mar. 8, 1960 |
| 2,968,761 | Zimmerman et al. | Jan. 17, 1961 |

FOREIGN PATENTS

| | | |
|---|---|---|
| 746,114 | Great Britain | Mar. 7, 1956 |

OTHER REFERENCES

Suryan: Physical Review, vol. 80, No. 1, October 1950, p. 119.

Hahn: Physics Today, vol. 6, No. 11, November 1953, pp. 4–9.

Hahn: Physical Review, vol. 77, pp. 297–8 (Jan. 15, 1950).